(12) United States Patent
Seyr et al.

(10) Patent No.: US 9,599,255 B2
(45) Date of Patent: Mar. 21, 2017

(54) HOLLOW PROFILE

(75) Inventors: Alfred Seyr, Statzenolorf (AT); Christian Hauser, Vienna (AT)

(73) Assignee: VOESTALPINE KREMS GMBH, Krems an der Donau (AT)

( * ) Notice: Subject to any disclaimer, the term of this patent is extended or adjusted under 35 U.S.C. 154(b) by 97 days.

(21) Appl. No.: 14/349,528

(22) PCT Filed: Aug. 23, 2012

(86) PCT No.: PCT/AT2012/000218
§ 371 (c)(1),
(2), (4) Date: Sep. 24, 2014

(87) PCT Pub. No.: WO2013/049866
PCT Pub. Date: Apr. 11, 2013

(65) Prior Publication Data
US 2015/0027582 A1    Jan. 29, 2015

(30) Foreign Application Priority Data
Oct. 3, 2011   (AT) ................ A 1424/2011

(51) Int. Cl.
*F16L 9/00*   (2006.01)
*F16L 9/02*   (2006.01)
*E04C 3/07*   (2006.01)
*E04C 3/04*   (2006.01)

(52) U.S. Cl.
CPC ........ *F16L 9/02* (2013.01); *E04C 3/07* (2013.01); *E04C 2003/043* (2013.01); *E04C 2003/0413* (2013.01); *E04C 2003/0439* (2013.01); *E04C 2003/0447* (2013.01); *E04C 2003/0465* (2013.01)

(58) Field of Classification Search
CPC .......... F16L 9/02; E04C 2003/043; E04C 2003/0447; E04C 2003/0465
USPC .......................... 138/156, 158, 159
See application file for complete search history.

(56) References Cited

U.S. PATENT DOCUMENTS

| | | | | |
|---|---|---|---|---|
| 127,019 A * | 5/1872 | Bonzano | ............ | H02G 3/0418 138/159 |
| 939,039 A * | 11/1909 | Lawrence | ................ | F16L 9/18 138/111 |
| 3,243,503 A * | 3/1966 | Burley | ................ | H02G 3/0418 138/159 |
| 3,733,461 A * | 5/1973 | Rohats | ................... | H05B 3/009 250/493.1 |
| 5,602,364 A * | 2/1997 | Ustin | ................... | H02G 3/0418 138/157 |
| 2002/0096224 A1* | 7/2002 | Goodhue | ................ | F16L 23/14 138/109 |

FOREIGN PATENT DOCUMENTS

WO    WO 2006041497 A1 *  4/2006  ............... E04C 3/07

* cited by examiner

*Primary Examiner* — Patrick F Brinson

(57) ABSTRACT

A profile is produced from a bent metal sheet surrounding an interior space by at least 360°, the longitudinal edges of said metal sheet being connected to respectively adjacent wall sections of the metal sheet. The longitudinal edges are separated from the respectively adjacent wall sections or longitudinal edges by spacers and are connected thereto in a form-fitting manner by fasteners such as screws, rivets, or the like.

18 Claims, 3 Drawing Sheets

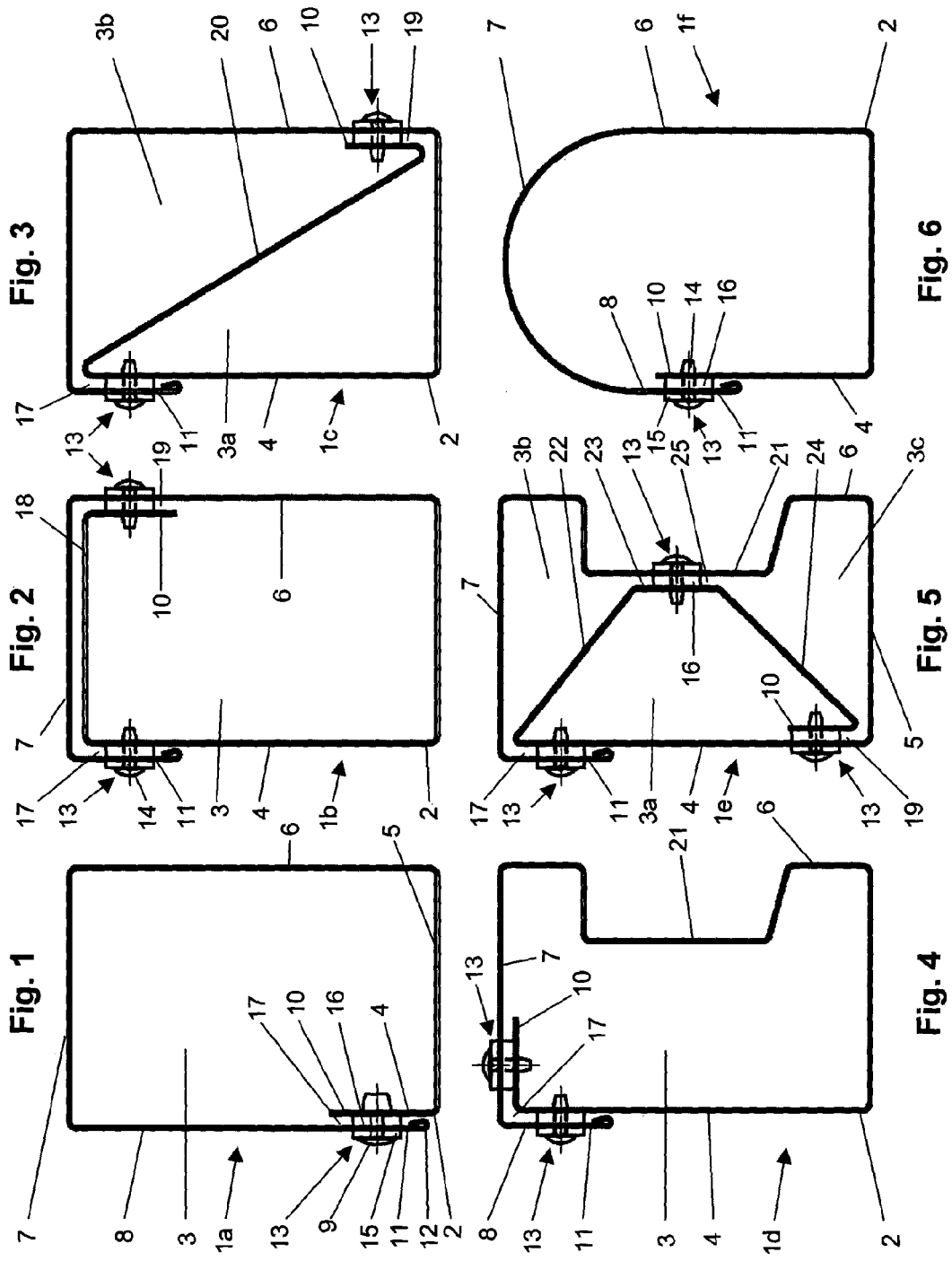

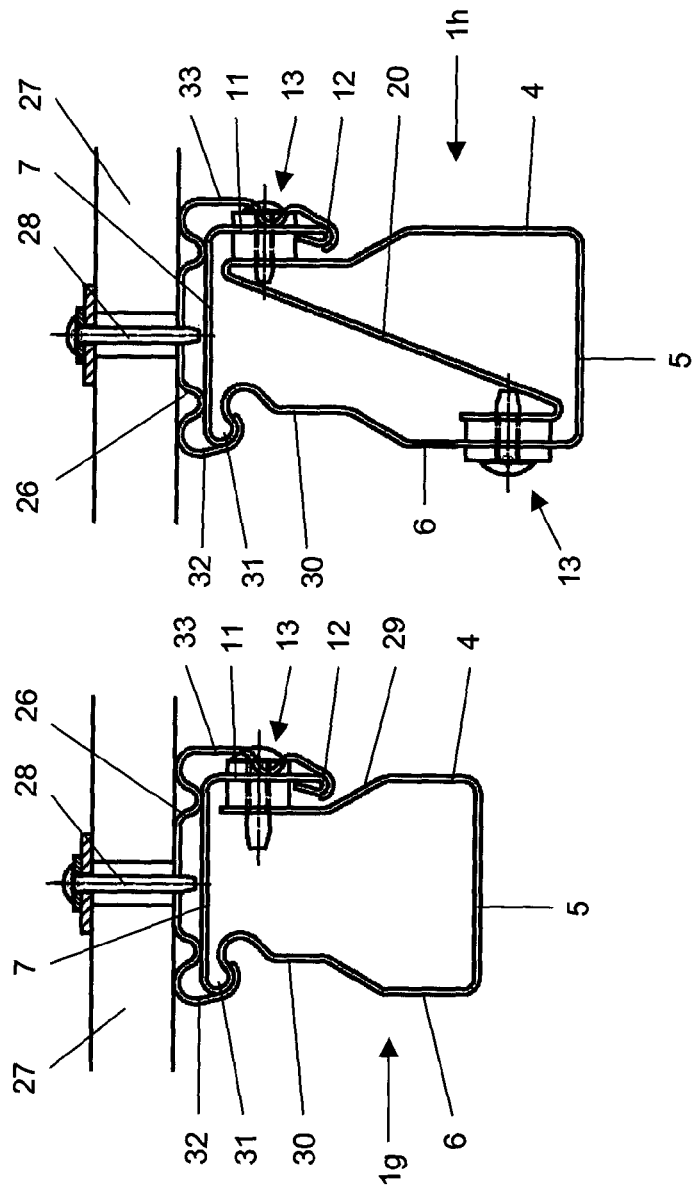

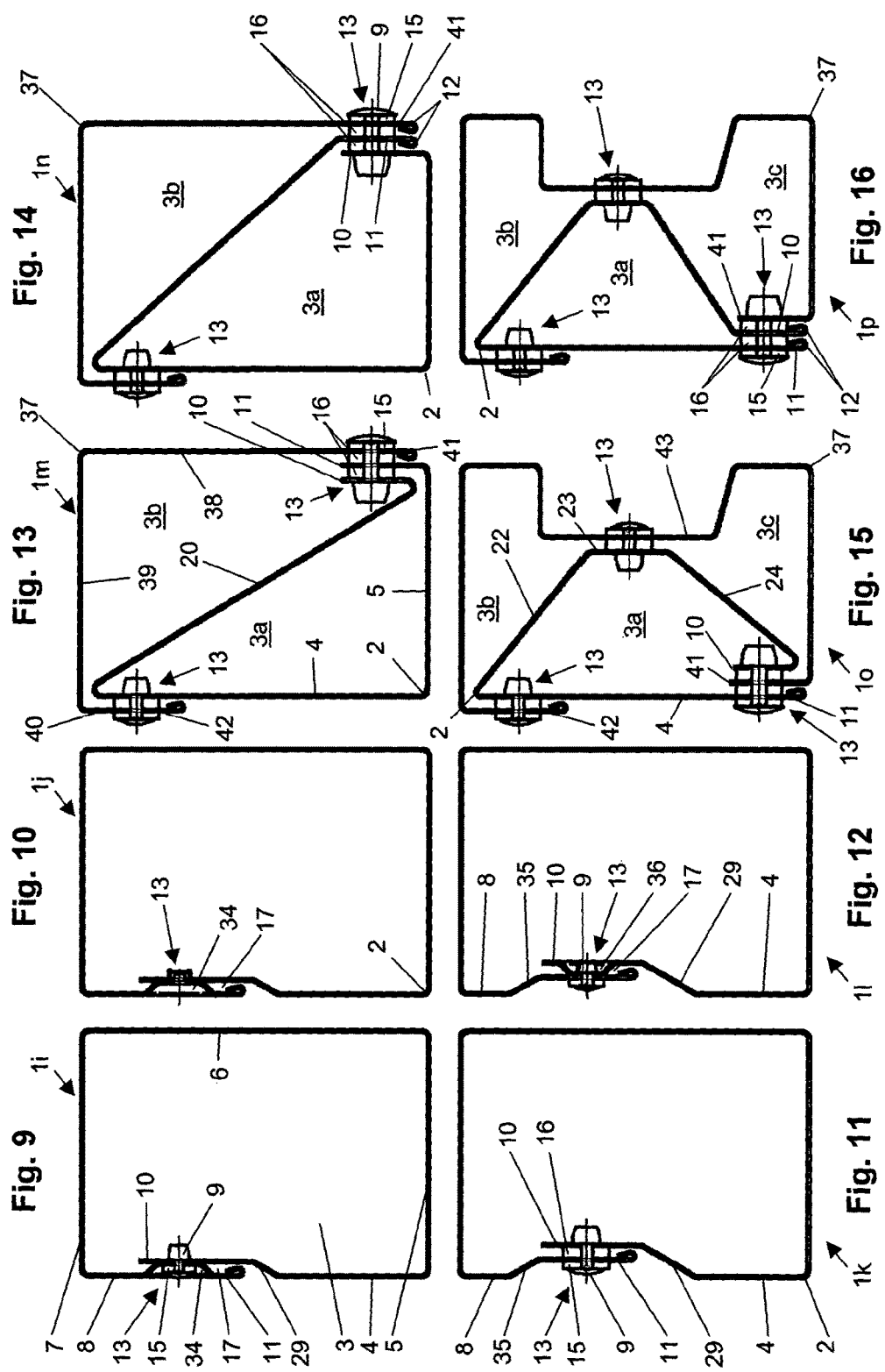

HOLLOW PROFILE

FIELD OF THE INVENTION

The invention relates to a profile with at least one bent metal sheet surrounding an interior space by at least 360°, the longitudinal edges of said metal sheet being fastened to respectively adjacent wall sections of the metal sheet.

BACKGROUND OF THE INVENTION

The preferred application field of such profiles, which are preferably made of highly corrosion-resistant, coil-coated input stock, is in roof- and ground-mounted support structures used in the solar industry or other thin-walled substructures with outstanding corrosion-protection properties that are preferably also suitable for corrosion-protection classes C3-h and C4-h according to the DIN 12944 standard.

Aluminum profiles, aluminum tubing, or welded tubes have been used for this purpose up to now in the prior art; aluminum tubing and aluminum profiles are relatively expensive and require the use of a large amount of material due to their lower strength in comparison to steel. Open profiles composed of aluminum or steel have poor strength values (bending, torsion) and are difficult or impossible to stiffen economically or in a correct way from a corrosion protection standpoint. Welded tubes do in fact have good strength properties, but for special applications, can only be stiffened with difficulty and are problematic in terms of corrosion protection. With thin-walled tubes, there is a danger of warping during hot-dip galvanizing, while dip-coating yields only low layer thicknesses. In addition, pre-treatment is difficult. Furthermore, when powder-coating and wet-enameling, problems frequently arise with regard to paint adhesion and protection of the interior space. With coil-galvanized, welded steel, the weld seam finishing often causes problems in the subsequent coating process.

The object of the invention, therefore, is to create a profile that is easy to manufacture and has good strength and corrosion properties.

SUMMARY OF THE INVENTION

This object is attained according to the invention by virtue of the fact that the longitudinal edges are spaced apart from respectively adjacent wall sections or longitudinal edges by means of spacers and are fastened to them in a form-fitting manner by means of fasteners such as screws, rivets, or the like.

Since the profile, in particular the tube, according to the invention is a largely closed profile, it has good strength properties. The profile according to the invention is not completely closed since the longitudinal edges are spaced apart from the respectively adjacent wall sections by means of the spacers, as a result of which an air gap is produced, which ensures a good ventilation of the interior. This gap and the material doubling also increase the rigidity of the tube by means of the edge regions or wall sections that are spaced apart from each other.

Since the profile according to the invention is, so to speak, wound from a single metal sheet or from several of them, there is the possibility, when producing the tubular profile, of simultaneously also adding additional reinforcing elements, for example by having at least one wall section extending through the interior space.

By means of fasteners provided in addition to the ones along the longitudinal edges, in a preferred embodiment of the invention, wall sections can be fastened in a form-fitting manner by means of fasteners, thus further improving the strength of the profile according to the invention. In this way, it is possible, for example, to produce double-layered walls with layers that are spaced apart from each other in regions that experience high bending stresses or to produce single or multiple diagonal reinforcing elements (e.g. arranged in a V).

Other features and advantages of the invention ensue from the following description of preferred exemplary embodiments of tubes or hollow profiles according to the invention, taken in conjunction with the accompanying drawings.

BRIEF DESCRIPTION OF THE DRAWINGS

FIG. 1 shows a first embodiment of a profile according to the invention.

FIG. 2 shows a second embodiment of a profile according to the invention.

FIG. 3 shows a third embodiment of a profile according to the invention.

FIG. 4 shows a fourth embodiment of a profile according to the invention.

FIG. 5 shows a fifth embodiment of a profile according to the invention.

FIG. 6 shows a sixth embodiment of a profile according to the invention.

FIG. 7 shows a seventh embodiment of a profile according to the invention to which solar panels are fastened with the aid of clips.

FIG. 8 shows an eighth embodiment of a profile according to the invention to which solar panels are fastened, likewise with the aid of clips.

FIG. 9 shows a ninth embodiment of a profile according to the invention.

FIG. 10 shows a tenth embodiment of a profile according to the invention.

FIG. 11 shows an eleventh embodiment of a profile according to the invention.

FIG. 12 shows a twelfth embodiment of a profile according to the invention.

FIG. 13 shows a thirteenth embodiment of a profile according to the invention.

FIG. 14 shows a fourteenth embodiment of a profile according to the invention.

FIG. 15 shows a fifteenth embodiment of a profile according to the invention.

FIG. 16 shows a sixteenth embodiment of a profile according to the invention.

DETAILED DESCRIPTION OF THE PREFERRED EMBODIMENTS

FIG. 1 shows a first, simple, rectangular basic shape of a tube 1a according to the invention, embodied in the form of a hollow profile, which is composed of a for-example coil-galvanized, organically coil-coated steel sheet 2 with five wall sections 4, 5, 6, 7, and 8 and two longitudinal edges 10 and 11. The wall sections 4 through 8 enclose an interior space 3. The metal sheet 2 is attached along the longitudinal edges 10, 11 in a form-fitting manner by means of fasteners 13, which are blind rivets 9 in the embodiment shown.

In all of the embodiments, the longitudinal edges 10, 11 are flat regions of wall sections 4, 8, which are either edge regions of wall sections like wall section 8 or, in very short wall sections like wall section 4, constitute the entire wall section.

In the longitudinal direction of the profile 1a, i.e. at a right angle to the plane of the drawing, the profile can be of any length and can be open or closed at the ends. The number and spacing of the fasteners 13 in the longitudinal direction of the profile 1a depends on the required strength of the connection in the fastening region, the strength of the metal sheet 2 at the longitudinal edges, and the strength of the screws 14 and can be selected accordingly.

Between the longitudinal edges 10, 11, there are spacers 16, which can be made, for example, of plastic and keep the longitudinal edges 10, 11 spaced apart so that a gap 17 is produced, which on the one hand, ensures greater flexural rigidity of the profile in the region of the connection of the longitudinal edges 10, 11 and on the other hand, ensures ventilation of the interior space 3. On the outside of the longitudinal edge 11 and in the region of the screw head of the screw 14, a sealing washer 15 is provided, which is preferably also composed of plastic. It is also possible, however, for other materials to be used for both the sealing washers 15 and the spacers 16.

At the free edge, the outer longitudinal edge 11 has a beaded edge 12 that forms a drip lip, which keeps accumulated water away from the periphery of the longitudinal edge 11, which for manufacturing reasons, may not be as well-protected from corrosion as the flat regions of the metal sheet 2.

FIG. 2 shows an embodiment of a profile 1b according to the invention, which is reinforced in comparison to the embodiment in FIG. 1 and in which, adjacent to the wall section 4, there is an additional wall section 18 parallel to the wall section 7 and the longitudinal edge 10 is bent by 90° relative to the additional wall section 18 and situated parallel to the wall section 6 and is fastened to the latter, likewise by means of fasteners 13 (in this case, self-tapping sheet metal screws). This connection in this embodiment is embodied in exactly the same way as the connection between the wall section 4 and the longitudinal edge 11 that is parallel thereto so that here, too, a gap 19 is produced between the longitudinal edge 10 and the adjacent wall section 6, which extends between the wall sections 7 and 18 to the gap 17 so that in this embodiment as well, the interior space 3 is ventilated.

In the embodiment of a profile 1c according to the invention shown in FIG. 3, an inner wall section 20 that adjoins the wall section 4 extends diagonally through the interior space, which is thus divided into two interior space sections 3a and 3b. The wall section 20 extending diagonally through the interior space, which provides a significant stiffening of the profile 1c, is in turn adjoined by the wall section or longitudinal edge 10 of the metal sheet 2, which is fastened in the above-described way to the adjacent parallel wall section 6 by means of fasteners 13 so that a gap 19 is formed.

In the embodiment of a profile 1d according to the invention shown in FIG. 4, a double connection is provided in a corner region of the profile 1d. The longitudinal edge 10 and the longitudinal edge 11, which are both situated in the region of the same corner of the profile 1d, are each fastened to the adjacent wall section 7 and 8, respectively, with fasteners 13. To stiffen the profile 1d, a stiffening corrugation 21 extending in the longitudinal direction of the profile is additionally provided in the wall element 6.

In the embodiment of a profile 1e according to the invention shown in FIG. 5, an inner wall section 22 that adjoins the wall section 4 in the vicinity of the upper left corner of the profile 1e first extends diagonally through the interior space and is adjoined by an inner wall section 23, which extends parallel to the wall section of the stiffening corrugation 21 and then as it continues, in turn as the inner wall section 24, extends diagonally back toward the wall section 4 in the vicinity of the lower left corner of the profile 1e. In this way, the interior space of the profile 1e is divided into three interior space sections 3a, 3b, and 3c. The inner wall section 24 extending diagonally through the interior space is in turn adjoined by the edge section or longitudinal edge 10 of the metal sheet 2, which is fastened to the adjacent parallel wall section 4 by means of fasteners 13 forming the gap 19.

The inner wall section 23 parallel to the wall section of the stiffening corrugation 21 is, for example, fastened in the above-described way to the wall section of the stiffening corrugation 21 by means of fasteners 13 so that a gap 25 is formed. This design produces a tube 1e with a very high rigidity in which all of the interior space sections 3a, 3b, 3c are ventilated by means of the gaps 17, 25, and 19.

FIG. 6 shows a simpler embodiment of a profile 1f according to the invention, which is similar to the one in FIG. 1, but in which the upper wall section 7 is not flat but rather curved in a semicircular fashion. The region of the connection of the longitudinal edges 10, 11 with the aid of fasteners 13 has been shifted upward somewhat, but is otherwise embodied as described in connection with FIG. 1.

FIGS. 7 and 8 show embodiments of tubes 1g and 1h according to the invention, to which solar panels 27 are fastened with the aid of clips 26. The clips 26 can be fastened to the panels 27 in any way, for example by means of rivets or screws 28.

The embodiment of a profile 1g according to the invention shown in FIG. 7 has an offset 29 in the vicinity of the wall section 4 and has a stiffening corrugation 30 in the vicinity of the wall section 6. The offset 29 has the advantage that the longitudinal edge 11 does not protrude laterally beyond the wall section 4. The stiffening corrugation 30 is embodied so that a projection 31 is formed at the upper left corner of the profile 1g.

The embodiment of a profile 1h according to the invention shown in FIG. 8 is a similar to the one shown in FIG. 7, but like the embodiment shown in FIG. 3, has an inner wall section 20 extending diagonally through the interior space for stiffening purposes.

The clips 26 in the embodiment shown have two legs 32, 33; the one leg 32 embraces the projection 31 and the other leg 33 embraces the drip lip or beaded edge 12. The clips 26 have a limited length in the longitudinal direction of the profile 1g so that they can engage between adjacent fasteners 13. The clips likewise have (preferably three) small stiffening corrugations in order to have as little contact surface as possible with the profile. One of the stiffening corrugations is provided on the leg 33 and the other two are provided on the part that connects the two legs 32, 33. As a result, most of the clip 26, like the profile in the overlap region, is spaced a certain minimal distance apart from the profile in order to improve corrosion protection.

Naturally, the tubes can be fastened—for example by means of a similar clip mechanism—to a sub-frame while the solar panels are clipped in the above-described fashion to the top surface.

FIGS. 9 through 12 show embodiments of the invention in which steps have been taken so that no components protrude beyond the flat wall sections 4, 5, 6, 7, 8 so that the profiles 1i, 1j, 1k, 1l are easy to bundle and stack. For this purpose, the wall section 4 is once again provided with an offset 29 toward the interior 3 of the respective profile 1i, 1j, 1k, 1l.

In the embodiment of the profile 1*i* shown in FIG. 9, in the fastening regions in which the fasteners 13 are situated, the longitudinal edge 11 is provided with a row of deep-drawn cups 34 in which the head of each blind rivet 9 is accommodated or countersunk so that it does not protrude beyond the surface of the wall section 8. In addition, the spacer between the edge regions 10, 11 can be omitted, with the gap 17, viewed in the longitudinal direction of the profile 1*i*, still being provided between the cups 34. Cups of this kind can also be provided for fasteners 13 in other wall regions.

In the embodiment of a profile 1*j* in FIG. 10, which is very similar to the one in FIG. 9, the fasteners 13 in the form of blind rivets 9 have been replaced by a form-fitting connection that is referred to as clinching.

In the tube 1*k* in FIG. 11, the offset 29 is embodied as larger and the wall section 8 is also provided with an offset 35. It is thus possible to use a fastener of the kind that has already been described in connection with FIG. 1; in this embodiment as well, the fastener 13 does not protrude beyond the outer surfaces of the wall sections 4, 8.

By contrast with the embodiments of FIGS. 9 and 10, in the embodiment of a profile 1*l* shown in FIG. 12, the inner edge region 10 is provided with a row of cups 36; here, too, no spacers are provided. Naturally, in alternative embodiments, it is also possible to provide cups 34, 36 in both edge regions 10, 11 and to use shims or spacers 16 in connection with cups 34, 36.

FIGS. 13 through 16 show embodiments of the invention in which the profiles 1*m*, 2*n*, 1*o*, 1*p* are composed not only of one metal sheet 2, but also of an additional metal sheet 37 and the two metal sheets are fastened to each other with fasteners 13 in the above-described way. These embodiments are advantageous if it is not possible to form the overall cross section on a production line (number of struts, stock width), but it is in fact possible to produce individual shells or metal sheets 2, 37 with simpler cross-sections. Under some circumstances, therefore, the profiles 1*m*, 2*n*, 1*o*, 1*p* are simpler to produce out of two or more metal sheets 2, 37 than out of only one metal sheet 2, although it is possible to produce more complex cross-sections.

The embodiment in FIG. 13 once again produces an essentially rectangular outer contour with a wall element 20 extending diagonally through the interior for stiffening purposes, as is already known from the embodiment shown in FIG. 3. However, the profile 1*m* in the embodiment in FIG. 13 is composed of two metal sheets 2, 37, with the first metal sheet 2 encompassing the interior space 3*a* by 360° in a triangular shape and with the second metal sheet 37 filling the contour out to the essentially rectangular profile shape.

The metal sheet 37 has wall elements 38, 39, 40 with longitudinal edges 41, 42. The longitudinal edges 10, 11 of the metal sheet 2 are bent upward in parallel fashion and are fastened to the longitudinal edge 41 of the wall element 38 in the above-described way with the aid of fasteners 13 with blind rivets; in this case, two spacers 16 are provided between the three longitudinal edges 10, 11, 41. The other longitudinal edge 42 of the metal sheet 37 is likewise fastened to the wall element 4 in the above-described way with the aid of fasteners 13.

The embodiment in FIG. 14 is very similar to the one in FIG. 13, except for the fact that the longitudinal edge 11 is oriented downward and, like the longitudinal edge 41, has a drip lip 12.

In the embodiment in FIG. 15, a basic shape of a profile 1*o* is produced, which is similar to the one in FIG. 5; in FIG. 15, two metal sheets 2, 37 are once again used to produce this basic shape. The metal sheet 2 encloses an interior space 3*a* in a trapezoidal shape and the metal sheet 37 once again fills out the contour to the essentially rectangular profile shape.

The longitudinal edges 10, 41 of the metal sheets 2, 37 are bent upward in parallel fashion and are fastened to the longitudinal edge 11 of the wall element 4 in the above-described way with the aid of fasteners 13 with blind rivets; once again, two spacers 16 are provided between the three longitudinal edges 10, 11, 41. A stiffening corrugation 43 extending in the longitudinal direction of the profile 1*o* is provided to stiffen the profile 1*o* and for this reason, is also fastened to the wall element 23 of the metal sheet 2 with the aid of fasteners 13.

The embodiment of the profile 1*p* in FIG. 16 is very similar to the one in FIG. 15, except for the fact that the longitudinal edge 11 is oriented downward and, like the longitudinal edge 10, has a drip lip 12.

The drawings show embodiments of the invention in which a single metal sheet 2 surrounds an interior space 3, 3*a* by at least 360°, where the tube profile can be filled out to a rectangular shape, for example, with another metal sheet 37. With the invention, however, it is also possible for two or more metal sheets together to surround an interior space by at least 360°, with each metal sheet therefore respectively encompassing the interior space by an angle of less than 360°. It is thus possible, for example, to fasten two U-shaped metal sheets to produce a profile that encompasses an interior space by 360°.

Naturally, the structural features described in connection with the embodiments shown can be arbitrarily combined with one another so that it is also possible to produce mixed forms of the individual embodiments as well as entirely different embodiments and basic shapes of profiles that are not essentially rectangular like the embodiments shown in the drawings and described with reference to them, but are for example triangular, I-shaped, T-shaped, L-shaped or multi-angular in some other way and possibly provided with curved wall sections, as shown by way of example by the embodiment in FIG. 6.

In addition, T-shaped, dovetail-shaped, keyhole-shaped, or mushroom-shaped grooves or similar, but differently shaped grooves can be provided at any suitable location on the wall sections to facilitate accommodation of fasteners.

The use of double-layered metal sheets is also possible, whose individual layers can, as needed, be spaced apart from one another in regions that experience powerful bending stresses or bending loads.

The invention claimed is:

1. A profile, comprising:
   at least one bent metal sheet surrounding an interior space by at least 360°, longitudinal edges of said metal sheet being fastened to respectively adjacent wall sections of the metal sheet or to one another, wherein a first longitudinal edge is spaced apart from a respectively adjacent wall section or from a second longitudinal edge by at least one spacer that is positioned between the first longitudinal edge and the respectively adjacent wall section or between the first longitudinal edge and the second longitudinal edge; further comprising in at least one longitudinal edge or at least one wall section, deep-drawn cups in fastening regions in which the fasteners are located, and the deep-drawn cups are spacers; and the longitudinal edges are fastened to the respectively adjacent wall sections or to one another in a form-fitting manner with fasteners.

2. The profile according to claim 1, wherein the longitudinal edges overlap each other and are fastened to each other in an overlapping region.

3. The profile according to claim 1, wherein the longitudinal edges are fastened to the respectively adjacent wall sections on opposite sides of the profile.

4. The profile according to claim 1, wherein the longitudinal edges are fastened to the respectively adjacent wall sections on adjacent sides of the profile.

5. The profile according to claim 1, wherein the longitudinal edges are fastened to the respectively adjacent wall section or longitudinal edge on the same side of the profile.

6. The profile according to claim 1, wherein the profile further comprises at least one wall section extending through the interior space.

7. The profile according to claim 6, wherein, in addition to the fasteners provided at the longitudinal edges, at least one of the wall sections is fastened in a form-fitting manner with fasteners.

8. The profile according to claim 7, wherein the wall sections are spaced apart from each other with spacers.

9. The profile according to claim 1, wherein longitudinal edges situated outside the interior space are beaded.

10. The profile according to claim 1, further comprising a second profiled metal sheet fastened to the metal sheet with fasteners.

11. The profile according to claim 10, wherein the fasteners fasten three longitudinal edges and/or wall sections to one another.

12. The profile according to claim 11, wherein the fasteners fasten two longitudinal edges of the metal sheet and one longitudinal edge of the second profiled metal sheet to one another.

13. The profile according to claim 12, wherein a second longitudinal edge of the second profiled metal sheet is fastened to a wall section of the first metal sheet with fasteners.

14. The profile according to claim 1, wherein a single metal sheet surrounds an interior space by at least 3600.

15. The profile according to claim 10, wherein two or more metal sheets together surround an interior space by at least 360°.

16. The profile according to claim 1, wherein the metal sheet is composed of coil-galvanized, organically coil-coated steel.

17. The profile according to claim 1, wherein the fasteners pass through the spacers.

18. The profile according to claim 1, wherein the profile is a tube.

* * * * *